(12) United States Patent
Brower

(10) Patent No.: US 6,421,219 B1
(45) Date of Patent: *Jul. 16, 2002

(54) BALANCED WIRE CONNECTOR

(75) Inventor: Boyd G. Brower, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/503,630

(22) Filed: Feb. 14, 2000

Related U.S. Application Data

(63) Continuation of application No. 09/164,783, filed on Oct. 1, 1998, now Pat. No. 6,025,982.

(51) Int. Cl.[7] .................................................. H02H 1/00
(52) U.S. Cl. ............................ 361/119; 361/56; 361/58; 361/111
(58) Field of Search ............................. 361/119, 56, 58, 361/111

(56) References Cited

U.S. PATENT DOCUMENTS

| | | | |
|---|---|---|---|
| 4,737,880 A | 4/1988 | Michelson | 361/119 |
| D347,618 S | 6/1994 | Butler, III et al. | D13/133 |
| 5,333,193 A | 7/1994 | Cote et al. | 379/399 |
| D353,380 S | 12/1994 | Baum et al. | D14/240 |
| D354,939 S | 1/1995 | Jensen et al. | D13/133 |
| 5,410,596 A | 4/1995 | Shannon et al. | 379/412 |
| 5,416,837 A | 5/1995 | Cote et al. | 379/399 |
| 5,423,694 A | 6/1995 | Jensen et al. | 439/417 |
| 5,508,877 A | 4/1996 | Smith | 361/119 |
| 5,537,471 A | 7/1996 | Smith | 379/399 |
| 5,548,641 A | 8/1996 | Butler et al. | 379/399 |
| 5,570,422 A | 10/1996 | Napiorkowski et al. | 379/399 |
| 5,588,869 A | 12/1996 | Jensen et al. | 439/417 |
| 6,025,982 A | * 2/2000 | Brower | 361/119 |

* cited by examiner

Primary Examiner—Stephen W. Jackson

(57) ABSTRACT

A weatherproof protector module for telecommunication circuits has wire insertion points that are arranged in lateral, forward and rearward symmetry about a single stuffer screw. The module contains J-shaped insulation displacement connectors (IDCs) with slits for engaging the wires. The symmetry of the module allows the screw to exert balanced forces in every direction as the wires engage the IDCs. The module also contains an insulative gel that is extruded around the wire contact locations when the wires are engaged. A wiper seal located each wire insertion point and a thixotropic gel prevent the expulsion of the insulative gel from the module after extrusion.

10 Claims, 8 Drawing Sheets

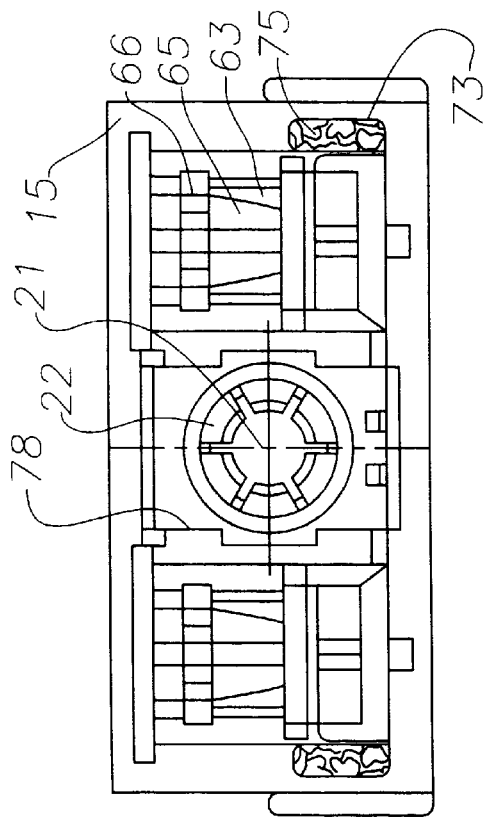
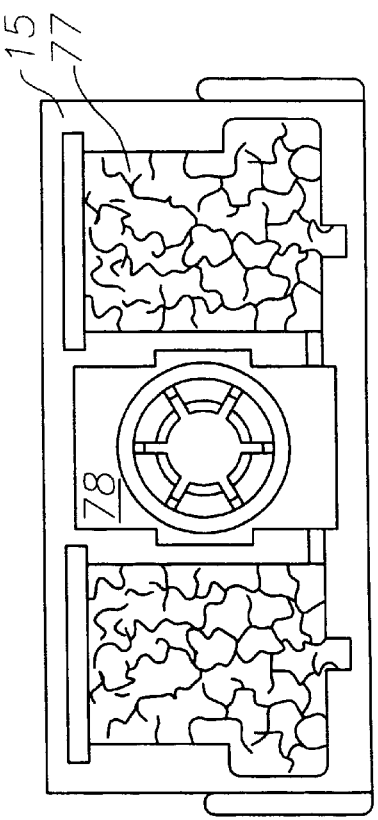
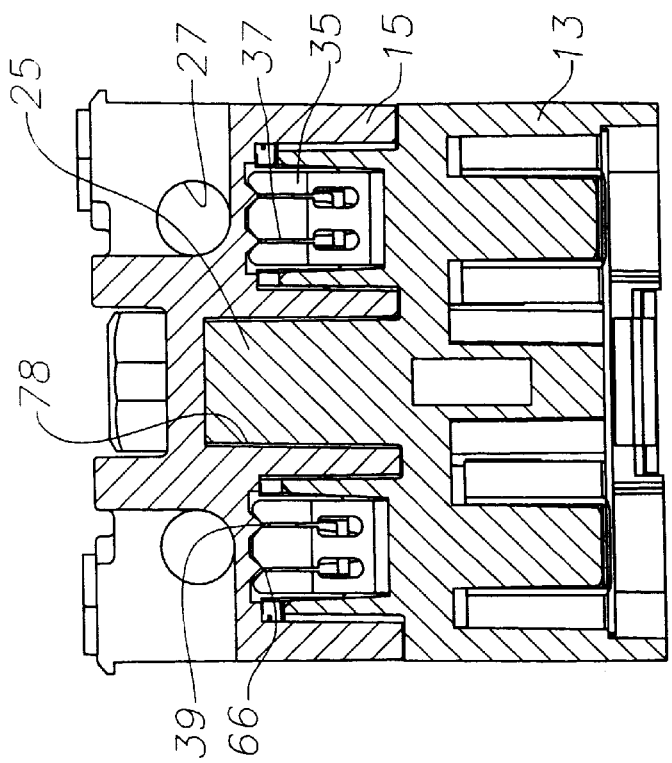

BALANCED WIRE CONNECTOR

This application is a continuation application of Ser. No. 09/164,783, filing date Oct. 1, 1998 now U.S. Pat. No. 6,025,982.

TECHNICAL FIELD

This invention relates in general to electrical connectors and in particular to a weatherproof protector module for telecommunication circuits.

BACKGROUND ART

There are several prior art weatherproof protector modules that utilize insulation displacement connectors (IDC) to interconnect with telecommunication circuits. An IDC connector has a blade with a sharp-edged slit that cuts through the insulation of an inserted wire to establish electrical continuity between the IDC connector and the wire. The protector module has a grounded protector device that connects a telephone subscriber wire to a telephone company wire. Under normal conditions, the protector device will not conduct electricity. If the protector device experiences a voltage overload, it will conduct the overload to ground to prevent the excess voltage from damaging telephone equipment located inside a user facility. Protector devices are usually either a solid state device employing thyristors or two plates with a gap between them and located in a gas-filled chamber.

In general, IDC-type protector modules have increased in size to provide room for multiple stuffer screws or a keyed stuffer to provide a positive insertion of the wires. One type of prior art module uses two screws that protrude into the housing body and take up more space than can be afforded in a smaller protector. Another type of prior art module stuffer does not allow for withdrawal of the subscriber wire because it is desirable to not disturb the customer wire contact once it is made. However, if the subscriber wire must be pulled out, insulation on the subscriber wire, or the subscriber wire itself, may come off and remain in the stuffer.

A third prior art design recognized the need for an IDC in a smaller module. This design also has two stuffer screws, each of which inserts a tip and a ring wire. This configuration allows each screw to stuff one of the larger telephone company wires and one of the smaller subscriber wires. Unfortunately, these screws are positioned so that they balance the "stuffing" stresses from side to side but not from front to back. Thus, the load is always unbalanced.

In addition, this type of module only has room for four IDC wire positions since the two screws take up so much space. Two of the IDC wire positions are for telephone company wires and two are for the subscriber wires. There are times when the telephone companies want to provide a jumper wire, but this design does not have enough wire termination positions to allow it. Moreover, this module also stuffs the wires down into an opaque base that hides the wire connections from view. An improved weatherproof protector module for telecommunication circuits would be desirable.

DISCLOSURE OF THE INVENTION

A weatherproof protector module for telecommunication circuits has wire insertion points at are arranged in lateral, forward, and rearward symmetry about a single stuffer screw. The module preferably contains J-shaped insulation displacement connectors (IDCs) with slits for gaging the wires. The symmetry of the module allows the single screw to exert balanced forces every direction as the wires engage the IDCs. The module also contains an insulative gel that is extruded around the wire contact locations when the wires are engaged. A seal insert located at each insertion point and a thixotropic gel prevent the expulsion of the insulative gel from the module after extrusion.

BRIEF DESCRIPTION OF THE DRAWINGS

FIG. 7 is a sectional side view of the module of FIG. 1 taken along the line 7—7 of FIG. 3;

FIG. 8 is a bottom view of the stuffer of FIG. 1, showing a first gel in place;

FIG. 9 is a bottom view of the stuffer of FIG. 1, showing a second gel in place;

BEST MODE FOR CARRYING OUT THE INVENTION

Figure 2:
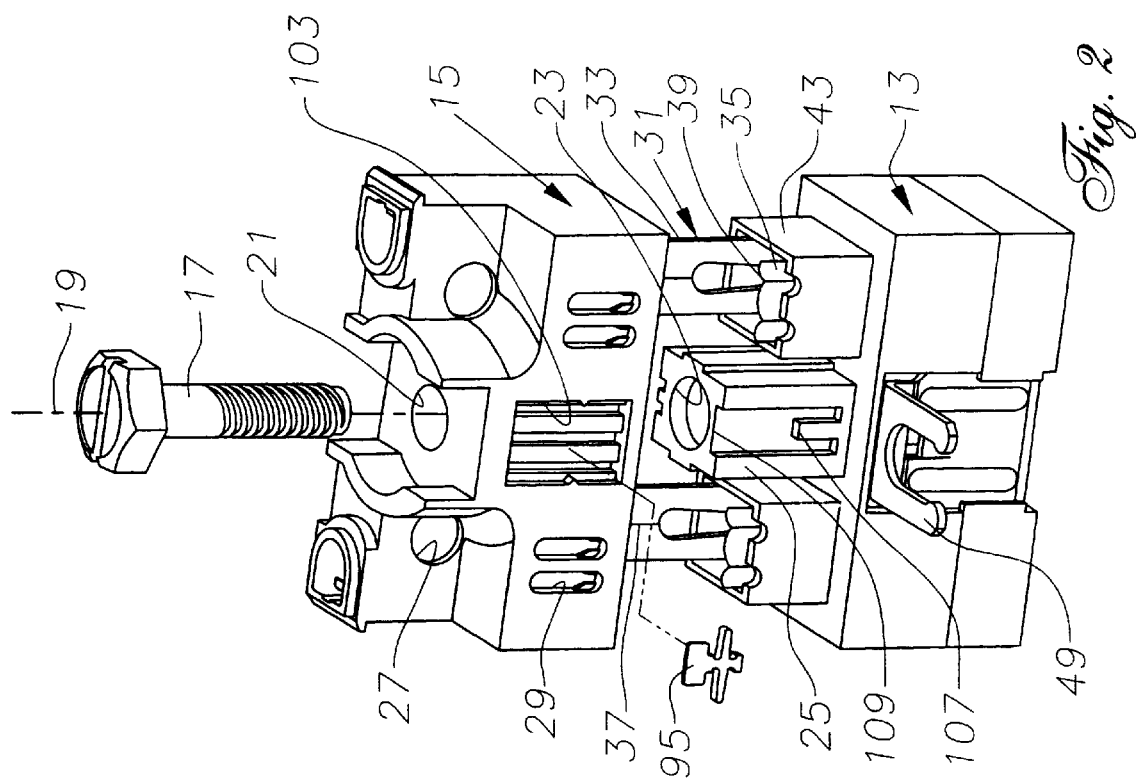
FIG. 2 is a partially exploded perspective view of the module of FIG. 1.
Figure 1:
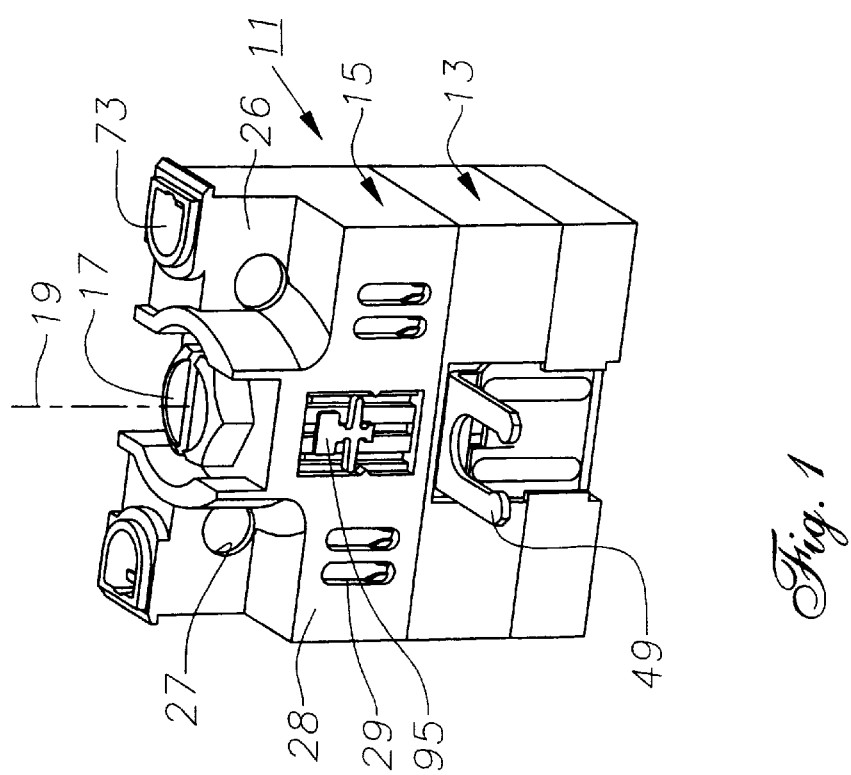
FIG. 1 is a perspective view of a module constructed in accordance with the invention, showing a base and a stuffer.
Figure 6:
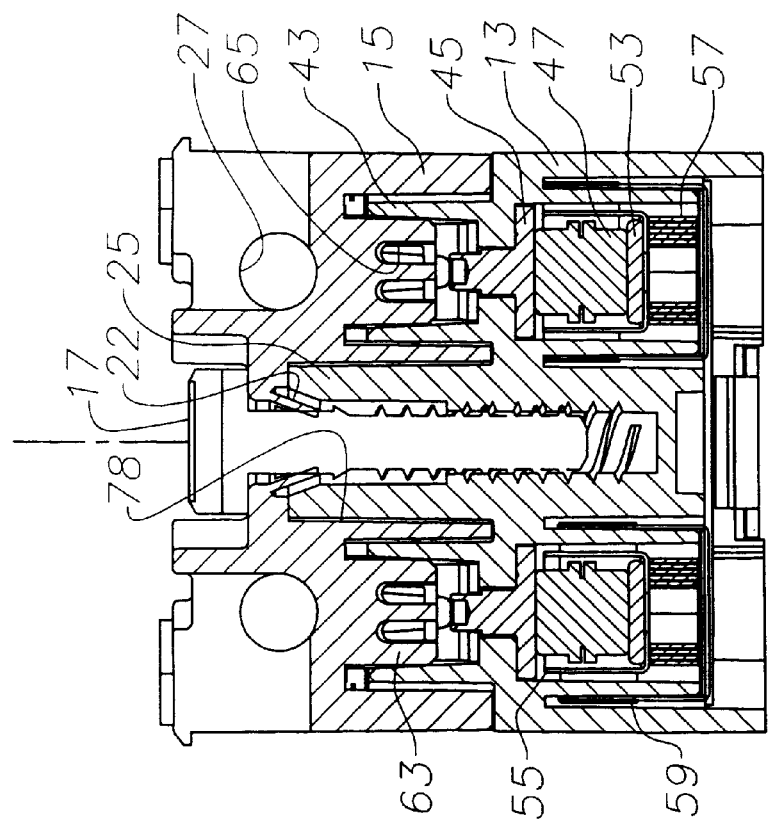
FIG. 6 is a sectional side view of the module of FIG. 1 taken along the line 6—6 of FIG. 3.

Referring to FIGS. 1 and 2, module 11 has a base 13 that is generally rectangular. A stuffer 15 is moveable relative to base 13 between a closed position shown in FIG. 1, an intermediate open position, and an open position. Stuffer 15 is secured to base 13 by a screw 17 that is located on a longitudinal axis 19. Screw 17 extends through hole 21 in stuffer 15 and into a threaded hole 23 in a post 25 protruding upward from base 13. A flange 22 (FIG. 6) within hole 21 causes stuffer 15 to move upward with screw 17 when screw 17 is rotated counterclockwise. The material of stuffer 15 is preferably a plastic that is sufficiently clear so as to be able to see wires contained therein.

Stuffer 15 has on its front side an offset upper face 26 that is located in the same plane as a lower face 28, but offset rearwardly from it. Upper face 26 is located in a plane on axis 19, parallel to and equidistant between a plane of the back of stuffer 15 and a plane of lower face 28. Two circular apertures 27 are formed in upper face 26. Each aperture 27 is sized to received a wire (not shown) that typically will connect module 11 to an outside telecommunications network, and thus for convenience herein will be referred to as a telco wire.

There are two pairs of elongated apertures 29 located in lower face 28 of stuffer 15. Apertures 29 have a greater axial length than width. The widths of apertures 29 are smaller than the diameter of circular apertures 27 for receiving smaller wires than the telco wires. The smaller wires typically lead from module 11 to equipment located within a residence or business and will be referred to herein as subscriber wires.

Referring to FIG. 2, the telco and subscriber wires inserted into apertures 27, 29 on each side of axis 19 are placed in electrical continuity with each other through insulation displacement connectors 31 (IDC). There are two of the IDCs 31, one located on one lateral side of axis 19 and the other located on the other lateral side of and equidistant from axis 19. Each IDC 31 has a rearward blade 33 that extends upward and registers with one of the circular apertures 27. Each IDC 31 has a forward blade 35 that is located forward of and parallel to rearward blade 33 for registering with one of the pairs of elongated apertures 29. Forward blade 35 is shorter than rearward blade 33 and is located the same distance forward of axis 19 as rearward blade 33 is rearward of axis 19.

Figure 5:
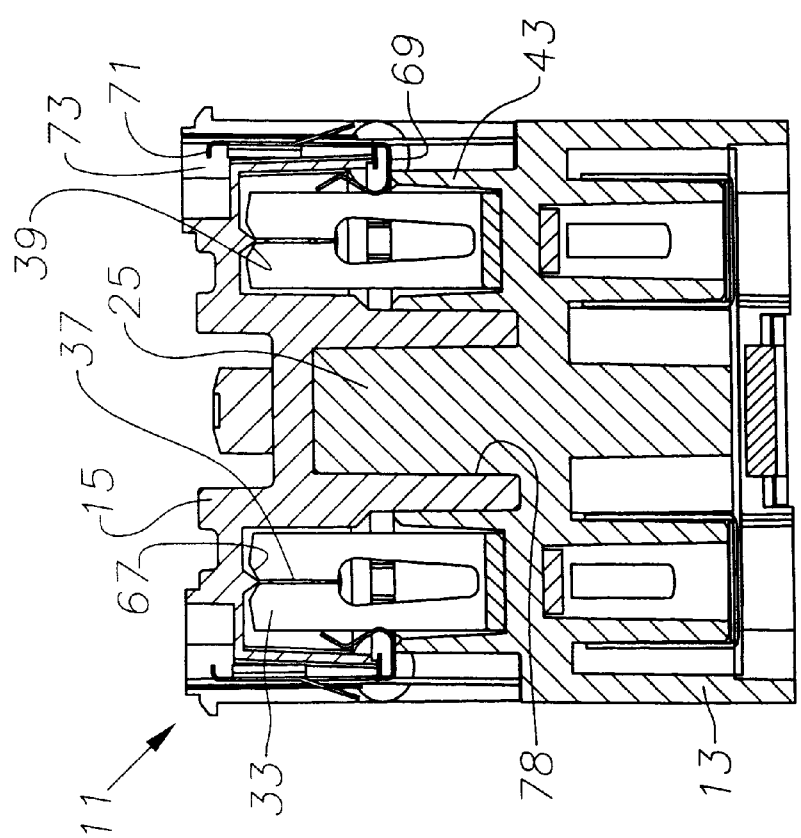
FIG. 5 is a sectional side view of the module of FIG. 1 taken along the line 5—5 of FIG. 3.

Each blade 33, 35 has at least one slit 37 with a converging entryway 39 at its upper edge as shown in FIGS. 5 and 7. Preferably, forward blade 35 has two slits 37 for receiving two subscriber wires, if desired. Each slit 37 allows its respective blade 33, 35 to spread apart as a wire is being pushed downward into it. The edges of each slit 37 are sharp for cutting the wire insulation to establish electrical continuity between a particular wire and the IDC 31. Rearward and forward blades 33, 35 are formed of a single piece of metal, having a flat base 41 (FIG. 11) and defining a generally a rectangular J-configuration. Each IDC 31 electrically connects one of the telco wires to one or two subscriber wires.

Referring still to FIG. 2, each IDC 31 is located within a cavity or gel well 43. Gel well 43 is a rectangular enclosure that surrounds a portion of each IDC 31 for containing an insulation gel. Gel well 43 has a preferable height or axial dimension that is approximately ¾ the height of forward blade 35. Referring again to FIG. 11, each IDC 31 is secured within one of the gel wells 43 by a rivet 45. Rivet 45 also serves to electrically connect its IDC 31 to one end of an excess voltage protector 47. Protector 47 is a commercially available device that will conduct from one end to its other end only when voltage above a certain level is encountered. Generally there are two types, one being a gas tube type and the other being a solid state type. Each protector 47 has one end that electrically connects to one of the IDCs 31 by way of rivet 45 and another end that electrically connects to a ground circuit through a ground contact 49. If a potential difference between ground contact 49 and an IDC 31 reaches a sufficiently high level, protector 47 will conduct or short to ground to prevent harm to subscriber equipment.

Figure 11:
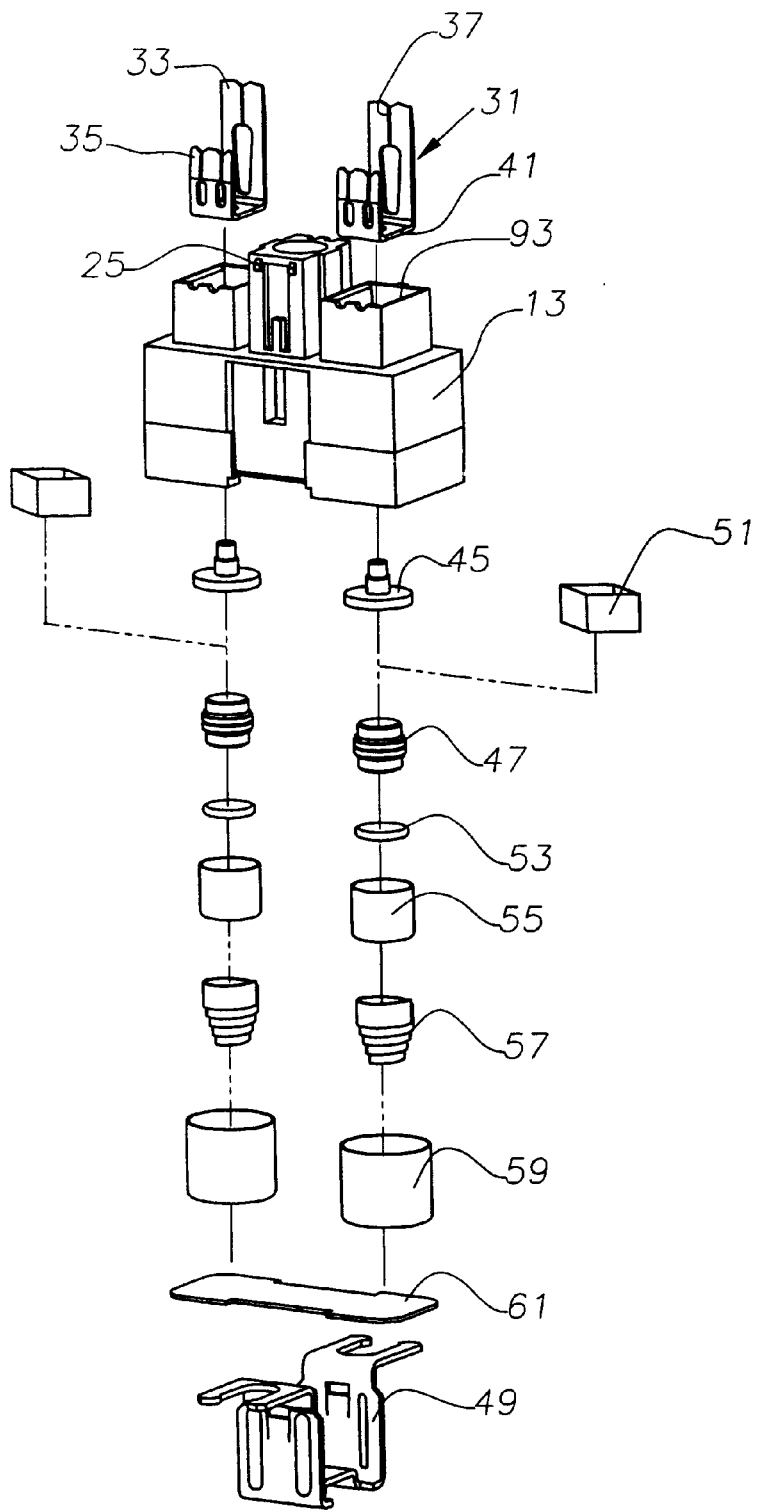
FIG. 11 is an upper exploded perspective view of the base of FIG. 1 along with its internal components.
Figure 12:
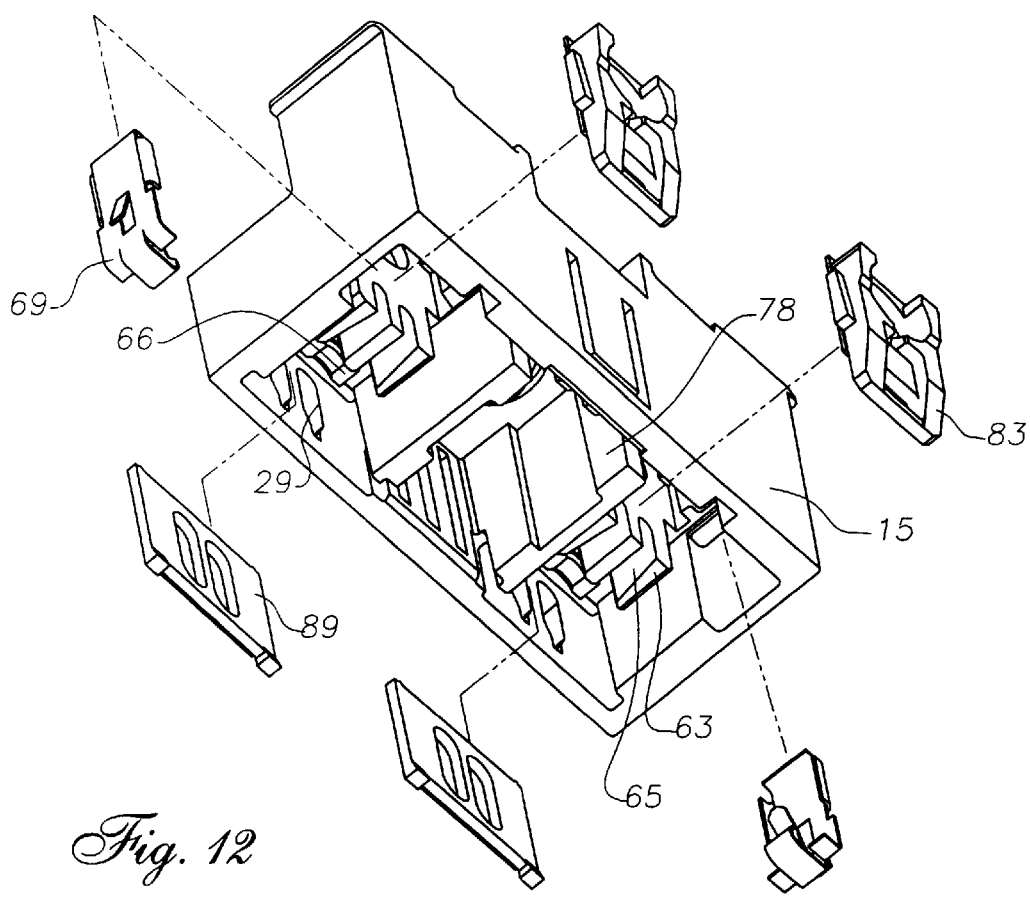
FIG. 12 is a lower exploded perspective view of the stuffer of FIG. 1.

A heat shrink wrap 51 encloses protector 47. A number of elements are shown in FIG. 11 for forming an electrical connection between protector 47 and ground contact 49. In the embodiment shown, the various elements include a fusible disk 53 sandwiched between the bottom of protector 47 and a metal can 55. Initially an open upper end of can 55 will be spaced a short distance from rivet 45. Fusible element 53 is preferably a tin-lead and bismuth alloy having a low melting point. Fusible element 53 will melt if the current passing through protector 47 is high enough to cause it to overheat. Once melted, metal can 55 will move toward and touch rivet 45, permanently shorting can 55 to rivet 45. Can 55 is in electrical continuity with ground contact 49 via a spring 57, another can 59, and a ground plate 61. If excessive current has been applied so as to damage protector 47, the melting of fusible element 53 places its IDC 31 in permanent contact with ground 49. When tested, the short informs the user that module 11 has been damaged due to excessive current and needs to be replaced.

Figure 4:
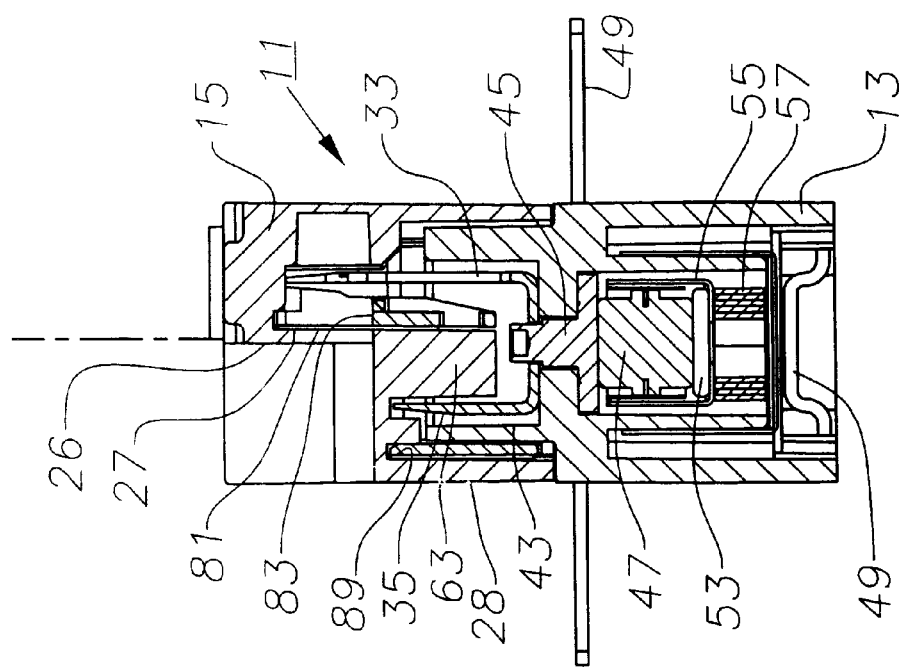
FIG. 4 is a sectional end view of the module of FIG. 1 taken along the line 4—4 of FIG. 3.
Figure 3:
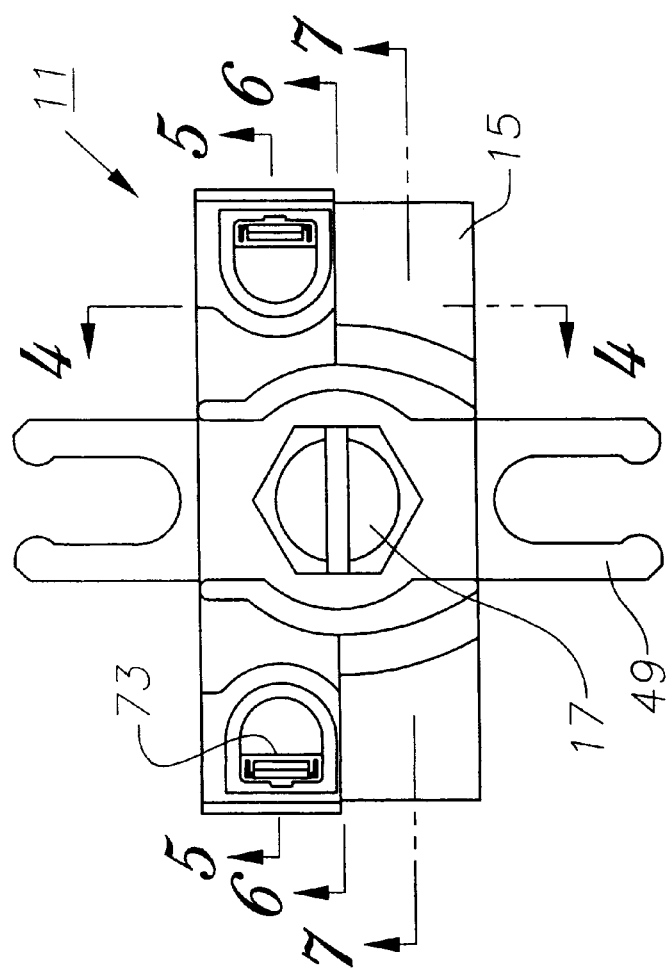
FIG. 3 is a top view of the module of FIG. 1.

Referring now to FIG. 4, stuffer 15 has an extruder 63 for each of the IDCs 31. Extruder 63 protrudes downward from the top of stuffer 15 and fits in gel well 43 between IDC blades 33, 35 when stuffer 15 is in the closed position. This forces gel contained in cavity or gel well 43 to flow throughout the spaces surrounding IDC 31 and seal the wires after insertion. Extruder 63 has a front side that is closely spaced to forward blade 35. Extruder 63 also has a pair of slots 65 for guiding subscriber wires into slits 37. As shown in FIG. 7, small triangular protuberances 66 extend downward from an interior portion of stuffer 15 to register with each entryway 39 of each forward blade 35. Protuberances 66 push the subscriber wires downward into slits 37 and retain them in place. Protuberances 66 are located forward of extruder 63. Protuberances 67 for pushing the telco wires into slits 37 of rearward blades 33 are shown in FIG. 5. Each protuberance 67 is located within stuffer 15 at its top for registering with each slit 37 of rearward blades 33. Protuberances 67 are also generally triangular in shape but may be any shape as long as it generally corresponds to the converging entranceway 39.

Module 11 has a test device to enable a technician to test module 11. The testing device includes a test port 73, shown in FIG. 5, for each of the IDCs 31. Each test port 73 has a J-shaped test contact 69 extending from an upper end 71 located on the exterior of stuffer 15 at the top to a lower portion that abuts an edge of rearward blades 33. Continuity may be checked by connecting a continuity tester between test contact 69 and each of the wires connected to the particular IDC 31. Also, connecting a continuity tester between ground contact 49 and test contact 69 indicates whether can 55 (FIG. 11) has shorted to IDC 31 through rivet 45 due to excessive current.

In the preferred embodiment, module 11 is water resistant so as to serve in areas where it might be exposed to excessive moisture. To seal against leakage, two types of insulation gels are employed. FIG. 8 is a bottom view of stuffer 15, with screw 17 (FIG. 1) not shown and test contacts 69 (FIG. 5) not shown. Test ports 73 are shown filled with a thixotropic gel 75, which is an insulative substance with an additive to make it thixotropic. That is, once disposed in test port 73, it will remain in that position. Gel 75 will not flow as a liquid would into other areas, rather has a rubbery texture immediately upon application. Thixotropic gels are commercially available and are normally opaque. The purpose of thixotropic gel 75 is to form a seal for test ports 73 before applying a primary insulative gel 77. Primary insulative gel 77, which is schematically shown in FIG. 9, is poured into the interior of stuffer 15 while inverted not long after thixotropic gel 75 has been applied. Primary gel 77 is clear and initially has a low viscosity, much lower than the viscosity of thixotropic gel 75. Primary gel 77 will run into the various spaces in the interior portions of stuffer 15 on each side of a central engagement member or cavity 78.

Central cavity 78 is sized to slide on post 25 (FIG. 2) and has four walls surrounding screw hole 21. Primary insulative gel 77 will also be poured into gel wells 43 (FIG. 2) during assembly. The amount of primary insulative gel 77 dispensed is calculated so that when stuffer 15 is moved to the closed position, the extruders 63 will cause the primary gel 77 to fully occupy the open spaces surrounding IDCs 31, but will not be in excess of the volume of the open spaces so as to be extruded out of module 11. Also, after testing at the factory, some primary gel 77 will be placed in the small recesses surrounding the upper ends of test ports 73 (FIG. 10) to cover upper ends 71 of test contacts 69. When dispensed into module 11, gels 75, 77 are uncured, but will cure over time, both having a rubbery soft texture after curing.

Figure 10:
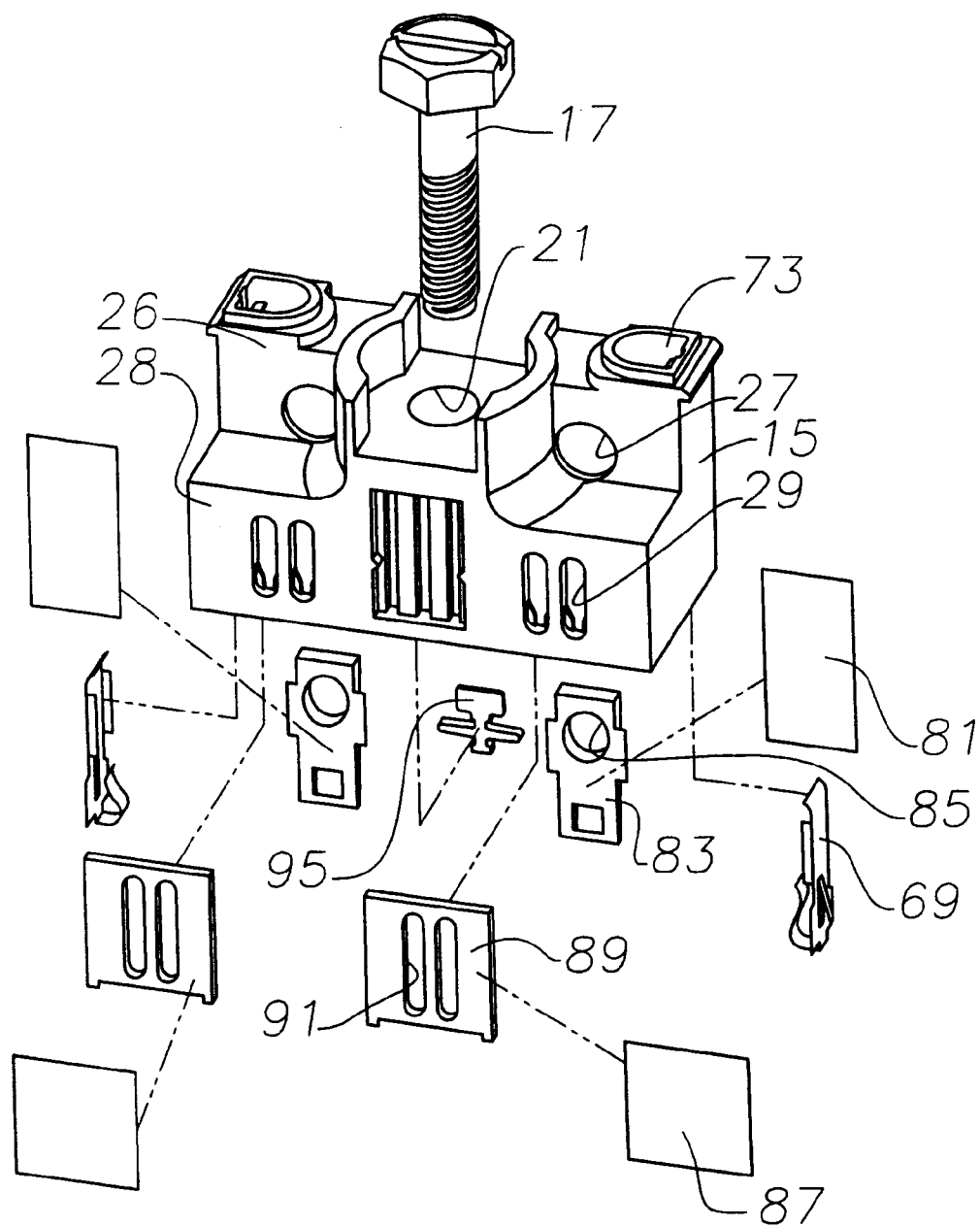
FIG. 10 is an upper exploded perspective view of the stuffer of FIG. 1 along with its internal components.

Referring to FIG. 10, stuffer 15 has devices to prevent gel 77 (FIG. 9) from being extruded or flowing out apertures 27, 29. These devices include a seal or wiper 81 that is located in the interior of stuffer 15, blocking each circular aperture 27. Each wiper 81 is a thin sheet of thermoplastic that is adapted to be pierced by a telco wire during installation. Alternately a small slit or hole may be placed in each wiper 81 for receiving a telco wire. Wiper 81 is held in position by a retainer 83. Retainer 83 fits against the interior surface of upper face 26. Retainer 83 is a solid rigid plastic member with an aperture 85 that is of the same diameter and registers with one of the apertures 27.

Similarly, a seal or wiper 87 is employed to block each pair of elongated apertures 29. Wiper 87 is also a thin sheet of thermoplastic and is adapted to be pierced by a subscriber wire. Alternately, a small slit or hole may be formed in wiper 87 for receiving a subscriber wire. Wiper 87 is located on the interior surface of lower face 28. A retainer 89 holds wiper 87 in place. Retainer 89 is a rigid plastic member with two elongated apertures 91 that are dimensioned the same as and register with apertures 29. Wipers 81, 87 will thus prevent any extrusion of primary gel 77 when stuffer 15 is initially moved to its closed position.

Figure 14:
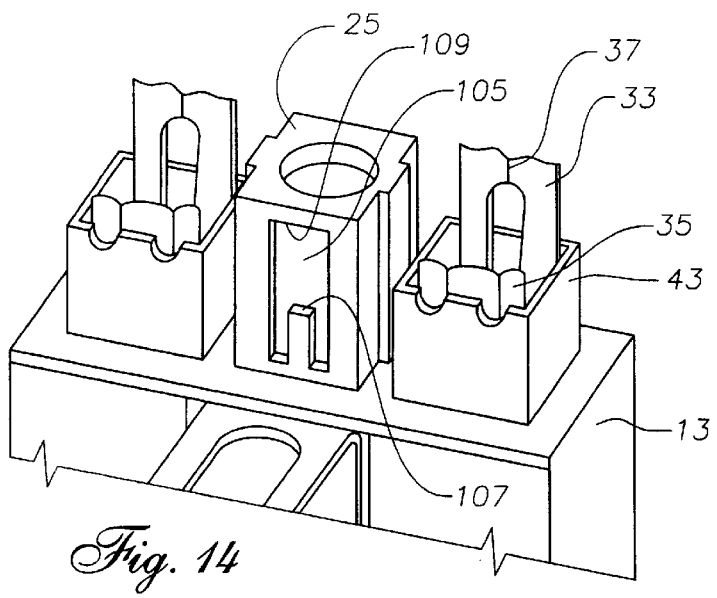
FIG. 14 is an enlarged partial perspective view of the base of FIG. 1.
Figure 15:
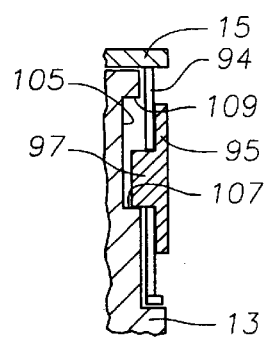
FIG. 15 is a partial sectional view of the module of FIG. 1, taken along the line 15—15 of FIG. 13.
Figure 16:
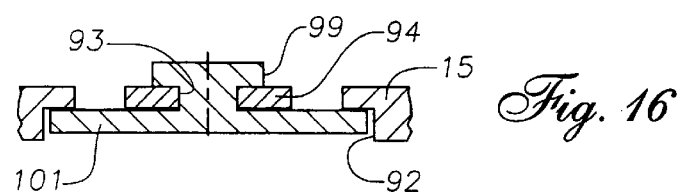
FIG. 16 is a partial sectional view of the module of FIG. 1 taken along the line 16—16 of FIG. 13.
Figure 17:
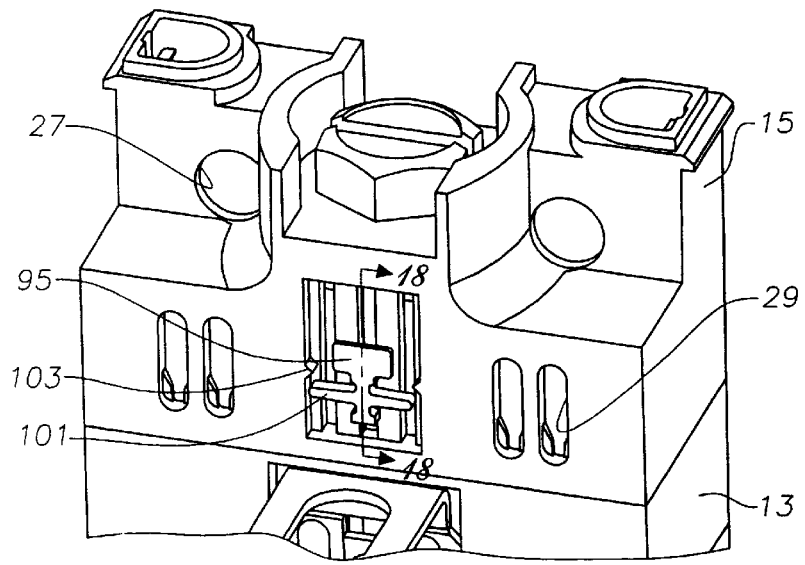
FIG. 17 is an enlarged partial perspective view of the module of FIG. 1, shown in an interim open position.

FIGS. 15–17 disclose a device on module that provides an audible signal when stuffer 15 reaches certain positions. One position of importance is an interim open position shown in FIG. 17. In the interim open position, screw 17 has been rotated counterclockwise to raise stuffer 15 high enough so that circular apertures 27 no longer register with rearward blades 33 of IDCs 31 (FIG. 14). When stuffer 15 moves upward relative to base 11, the telco wires will move upward with stuffer 15 and disengage rearward blades 33. The subscriber wires on the other hand will still be in engagement with forward blades 35 (FIG. 14) in the interim open position. This is due to the elongated dimension of apertures 29. The lower edges of apertures 29 will not pull the subscriber wires from their slits 37 until the lower edges of apertures 29 are above the entryways 39 of forward blades 35. This will not occur in the interim open position, rather the lower portions of apertures 29 will still be registering with slits 37. Consequently, the subscriber wires will remain connected. This interim open position allows the technician to perform various functions, and it is important that the technician know when the interim position is reached. If he unscrews screw 17 too much, the subscriber wires will also be withdrawn from IDCs 31, which would not be desirable for certain functions, including checking continuity. If the stuffer provides an audible indication at the interim open position, unscrewing of screw 17 past that position is less likely to occur. Also, under some circumstances, an audible indication when the stuffer 15 reaches the closed position would be helpful. The audible signal device includes a slot 93 formed in a recess 92 on lower face 28 of stuffer 15. Slot 93 is centered between lateral edges of stuffer 15 and is formed by two thin bands 94, one on each lateral side of slot 93. A snap member 95 is slidably carried in slot 93. Snap member 95 has a lug 97, shown in FIG. 15, that protrudes rearward past bands 94. Lug 97 has two shoulders 99 that engage the interior sides of bands 94, as shown in FIG. 16. Lug 97 and bands 94 retain snap member 95 on bands 94, but allow it to slide relative to stuffer 15. Shoulders 99 are small in dimension, and bands 94 have some flexibility. An assembler can install snap member 95 by simply pressing it into slot 93 until its shoulders 99 snap against the interior sides of bands 94.

Figure 13:
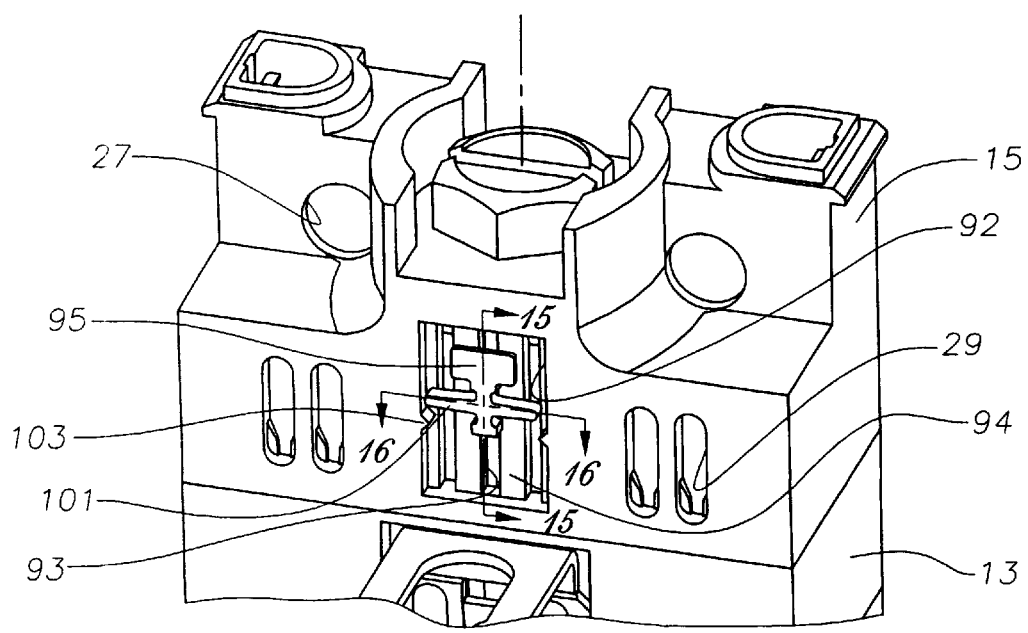
FIG. 13 is an enlarged partial perspective view of the module of FIG. 1 shown in a closed position.

Referring again to FIG. 13, snap member 95 has two laterally extending arms 101. Arms 101 extend laterally outward toward a side edge of recess 92. A protuberance 103 is located on each side edge 92. Protuberance 103 is a small triangular shaped member that is dimensioned to contact the tip of one of the arms 101. Although both protuberances 103 could be used, in this embodiment, only the left arm 101 is long enough to be contacted by protuberance 103 when stuffer 15 moves upward relative to snap member 95. After contact, if sufficient force is applied, arm 101 flexes and protuberance 103 moves past arm 101, making a significant snap or clicking noise. FIG. 17 shows arms 101 below protuberances 103, while FIG. 13 shows arms 101 above protuberances 103.

Figure 18:
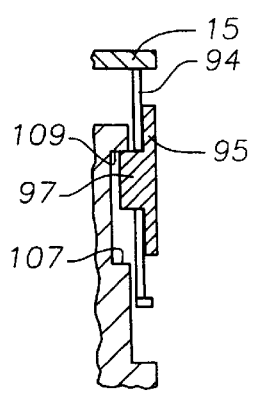
FIG. 18 is a partial sectional view of the module of FIG. 1, taken along the line 18—18 of FIG. 17.

The mechanism to force snap member 95 past protuberance 103 is illustrated in FIGS. 14, 15, and 18. Lug 97 of snap member 95 protrudes rearwardly into a recess 105 formed in post 25 of base 13. Recess 105 has a lower shoulder 107 that faces upward and an upper shoulder 109 that faces downward. Lower shoulder 107 is located on the upper end of a finger in the embodiment shown. Lug 97 can move only between the upper and lower shoulders 109, 107. When in the position shown in FIG. 13, a lower end of lug 97 contacts shoulder 107. When stuffer 15 moves upward, as shown in FIG. 18, snap member 95 will also move upward a short distance with stuffer 15 due to friction and also because the left arm 101 will be resting on the left protuberance 103. When the upper end of lug 97 contacts upper shoulder 109, snap member 95 can no longer move upward with stuffer 15. Continued upward movement of stuffer 15 and protuberance 103 relative to snap member 95 then causes arm 101 to flex and quickly snap past protuberance 103, giving an audible signal. This signal occurs at the interim open position shown in FIGS. 17 and 18.

Similarly, when closing stuffer 15, snap member 95 will move downward in unison with stuffer 15 until the lower edge of lug 97 contacts lower shoulder 107. Continued downward movement of stuffer 15 and protuberance 103 deflects arm 101 against protuberance 103, causing arm 101 to snap past protuberance 103 to the position shown in FIG. 13. Again, an audible signal results, indicating the closed position.

In operation, the technician will rotate screw 17 counterclockwise to a fully open position. In the fully open position, both apertures 27 and 29 will be located above and out of registry with blades 33, 35 of each IDC 31 (FIG. 2). The user inserts telco wires into circular apertures 27 and at least one subscriber wire into at least one of the elongated apertures 29 on each side of axis 19. During insertion, the wires will pierce wipers 81, 87 (FIG. 10). The user then rotates screw 17 clockwise, moving stuffer 15 to the closed position. As it moves to the closed position, snap member 95 will move from the position shown in FIG. 17, wherein arms 101 are below protuberances 103, to the position shown in FIG. 13.

During this occurrence, an audible signal is provided to the technician indicating that module 11 has been closed. As stuffer 15 closes, extruders 63 (FIG. 4) force primary insulative gel 77 (FIG. 9) to flow around the wires and into the open spaces surrounding IDCs 31. The wires occupy some volume of the interior, displacing some of the gel. The amount of gel in module 11 is selected so that a slight positive pressure will be applied to the gel after the wires have been installed and module 11 closed. Wipers 81, 87 (FIG. 10) help to reduce expulsion of gel out apertures 27, 29 and into the cavities as stuffer 15 is closed.

Should the technician wish to remove the telco wires, he rotates screw 17 counterclockwise until snap member 95 makes an audible click, indicating the interim open position. This audible clicks occurs due to upward movement of stuffer 15 relative to snap member 95, causing one of the protuberances 103 to flex and snap past one of the arms 101 (FIG. 13). At the interim open position, the telco wires will have moved out of slits 37 of rearward blades 33. This enables the technician to pull the telco wires from apertures 27. Wipers 81 (FIG. 10) strip gel from the telco wires as they are withdrawn to prevent significant loss of gel. The subscriber wires remain in place due to the elongated shape of apertures 29. Additionally, as the stuffer 15 is moved upward by the screw 17, the extruders 63 will cause, through negative pressure, the gel to be pulled upward from the wires and apertures 27. The gel then is less likely to be removed with the wires. When the stuffer 15 is later screwed back down, the gel is again extruded into the open spaces and again provides the small positive pressure on the gel.

The invention has significant advantages. The placement of an IDC equidistant on each side of the axis provide lateral balance and allows the use of a single screw for opening and closing the module. The forward and rearward blades of the IDCs provide forward and rearward balance about the screw. The use of a thixotropic gel seals the test ports to enable a low viscosity primary gel to be used within the stuffer without leakage into the test ports during assembly. The use of a low viscosity gel reduces the chance of bubbles and voids that can be detrimental. The wipers further seal around the wires and prevent expulsion of the gel when the stuffer is first assembled to the base. The snap member provides an audible indication when the stuffer has been unscrewed to an interim open position, avoiding unnecessary removal of the subscriber wires.

While the invention has been shown in only one of its forms, it should be apparent to those skilled in the art that it is not so limited, but is susceptible to various changes without departing from the scope of invention.

I claim:

1. A protector module for telecommunication circuits, comprising:
   a base having a bottom, a front, and a back;
   at least one IDC mounted to the base, the at least one IDC having a blade that extends generally upward from the base, the blade having a slit extending downward from an upper end;
   a stuffer mounted to the base for movement between an upper open position and a lower closed position;
   at least one aperture in the stuffer for registering with the at least one blade for insertion of a wire into engagement with the blade; and
   at least one protrusion in the stuffer for pressing the wire into the slit while moving from the open to the closed position.

2. The protector module of claim 1, wherein the slit at the upper end has an entryway with a predetermined configuration and the at least one protrusion has a configuration corresponding to the configuration of the entryway to hold the wire in the slit when the stuffer is in the closed position.

3. The protector module of claim 2, wherein the predetermined configuration is a triangular shape.

4. The protector module of claim 1, further comprising an overvoltage protector mounted in the base adjacent the at least one IDC.

5. The protector module of claim 1, wherein the blade is flat.

6. A protector module for telecommunication circuits, comprising:
   a base having a bottom, a front, a back, and a longitudinal axis;
   a pair of IDCs mounted to the base, one on each lateral side of the axis, each of the IDCs having a blade that extends generally upward from the base, the blades having a slit extending downward from an upper end;
   a stuffer mounted to the base for movement along the longitudinal axis between an upper open position and a lower closed position;
   a pair of lower apertures in the stuffer for registering with the blades for insertion of wires into engagement with the blades; and
   a set of protrusions in the stuffer for pressing the first and second wires into the slits while moving from the open to the closed position.

7. The protector module of claim 6, wherein the slit at the upper end has an entryway with a predetermined configuration and the at least one protrusion has a configuration corresponding to the configuration of the entryway to hold the wire in the slit when the stuffer is in the closed position.

8. The protector module of claim 7, wherein the predetermined configuration is a triangular shape.

9. The protector module of claim 6, further comprising an overvoltage protector mounted in the base adjacent the at least one IDC.

10. The protector module of claim 6, wherein the blades are flat.

* * * * *